US009577751B2

(12) United States Patent
Zhang et al.

(10) Patent No.: US 9,577,751 B2
(45) Date of Patent: Feb. 21, 2017

(54) METHOD, SYSTEM AND OPTICAL NETWORK TERMINAL OF ETHERNET PERFORMANCE DETECTION (71) Applicant: Huawei Technologies Co., Ltd., Shenzhen (CN)

(72) Inventors: Haibo Zhang, Shenzhen (CN); Jianfei Yue, Shenzhen (CN); Hongming Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/860,125

(22) Filed: Sep. 21, 2015

(65) Prior Publication Data

US 2016/0013862 A1 Jan. 14, 2016

Related U.S. Application Data (63) Continuation of application No. PCT/CN2013/088774, filed on Dec. 6, 2013.

(30) Foreign Application Priority Data

Apr. 8, 2013 (CN) .......................... 2013 1 0119491

(51) Int. Cl.
*H04B 10/08* (2006.01)
*H04B 10/079* (2013.01)
(Continued)

(52) U.S. Cl.
CPC ..... *H04B 10/0795* (2013.01); *H04L 41/0663* (2013.01); *H04L 41/0695* (2013.01);
(Continued)

(58) Field of Classification Search
CPC .. H04B 10/0775; H04B 10/0795; H04L 43/08
See application file for complete search history.

(56) References Cited

U.S. PATENT DOCUMENTS 7,889,754 B2 2/2011 Dec et al.
2007/0014290 A1 1/2007 Dec et al.
(Continued)

FOREIGN PATENT DOCUMENTS

CN 101675615 A 3/2010
CN 101834687 A 9/2010
(Continued)

OTHER PUBLICATIONS

Hertoghs, "Ethernet Connectivity Fault Management for Broadband," Architecture and Transport Working Group, DSLForum2000-XXX (Feb. 21, 2005).
(Continued)

*Primary Examiner* — Dzung Tran
(74) *Attorney, Agent, or Firm* — Leydig, Voit & Mayer, Ltd.

(57) ABSTRACT

The present invention provides an Ethernet performance detection method and system and an optical network terminal. The method includes: receiving, by an ONT, a detection configuration instruction, and configuring a maintenance end point according to the detection configuration instruction; configuring a performance detection path from the MEP to the VMEP according to states of the virtual maintenance end points configured on a main node and a backup node, wherein the VMEP includes two virtual MEPs, the IDs of the two virtual MEPs are identical, at the same moment; and transmitting a message to a node corresponding to the virtual MEP with the main state. When the node states of the main node and backup node are switched, the optical network terminal may automatically switch the performance detection path to the node corresponding to the virtual MEP, in order to continue to perform the network performance detection.

9 Claims, 6 Drawing Sheets (51) Int. Cl.
*H04L 12/24* (2006.01)
*H04L 12/713* (2013.01)
*H04L 12/26* (2006.01)
*H04Q 11/00* (2006.01)

(52) U.S. Cl.
CPC ...... *H04L 41/0803* (2013.01); *H04L 41/0806* (2013.01); *H04L 45/586* (2013.01); *H04L 43/0811* (2013.01); *H04L 43/10* (2013.01); *H04Q 2011/0083* (2013.01)

(56) References Cited

U.S. PATENT DOCUMENTS

| | | | |
|---|---|---|---|
| 2007/0025256 A1* | 2/2007 | Hertoghs | H04L 12/4633 370/236.2 |
| 2007/0237156 A1* | 10/2007 | Wang | H04L 12/5601 370/395.5 |
| 2008/0279105 A1 | 11/2008 | Absillis et al. | |
| 2010/0188983 A1 | 7/2010 | Washam et al. | |
| 2013/0114394 A1* | 5/2013 | Hu | H04L 41/0816 370/216 |
| 2013/0329565 A1* | 12/2013 | Holness | H04L 43/0811 370/241.1 |
| 2014/0099097 A1* | 4/2014 | Zheng | H04L 41/0663 398/5 |
| 2014/0286154 A1* | 9/2014 | O'Connor | H04L 41/0659 370/218 |
| 2015/0036510 A1* | 2/2015 | Bao | H04L 43/0811 370/241.1 |

FOREIGN PATENT DOCUMENTS

| | | |
|---|---|---|
| CN | 102215124 A | 10/2011 |
| CN | 102301648 A | 12/2011 |
| CN | 103227736 A | 7/2013 |
| WO | WO 2009102278 A1 | 8/2009 |
| WO | WO 2012155299 A1 | 11/2012 |

OTHER PUBLICATIONS

"Series G: Transmission Systems and Media, Digital Systems and Networks; Packet over Transport aspects—Ethernet over Transport aspects; Series Y: Global Information Infrastructure, Internet Protocol Aspects and Next-Generation Networks; Internet protocol aspects—Operation, administration and maintenance; OAM functions and mechanisms for Ethernet based networks," Recommendation ITU-T G.8013/Y.1731, pp. i-81, International Telecommunication Union, Geneva, Switzerland (Jul. 2011).

\* cited by examiner

FIG. 7 ated patent
METHOD, SYSTEM AND OPTICAL NETWORK TERMINAL OF ETHERNET PERFORMANCE DETECTION

CROSS-REFERENCE TO RELATED APPLICATIONS

This application is a continuation of International patent application Ser. No. PCT/CN2013/088774, filed on Dec. 6, 2013, which claims priority to Chinese Patent Application No. 201310119491.7, filed on Apr. 8, 2013, both of which are hereby incorporated by reference in their entireties.

TECHNICAL FIELD

The present application belongs to communication field, and particularly, to a method and a system and an optical network terminal of Ethernet performance detection.

BACKGROUND

In an ITU-T Y.1731 protocol, Ethernet performance measurement is based on point-to-point measurement, no performance measurement solution under a network node redundancy scenario is provided, which results in that after an end node at one side of Y.1731 performance measurement is switched to a backup node due to failure, daily performance monitoring measurement will be interrupted, and the daily performance monitoring measurement may be restored only when detection is manually reestablished or when the failure of the node is restored and service is switched back.

Figure 1:
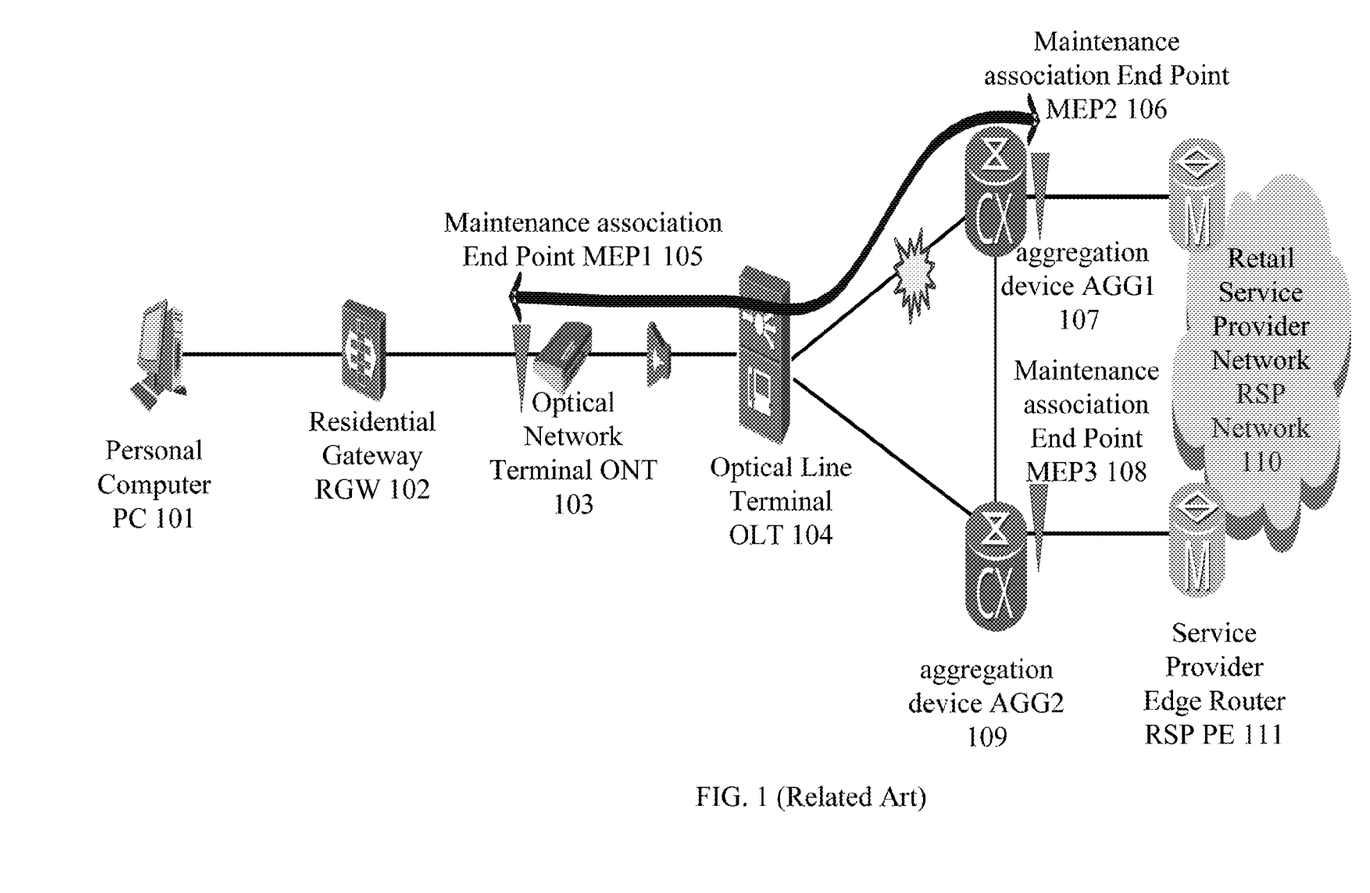
FIG. 1 is a schematic diagram of a solution used for performing network performance measurement under a network node redundancy scenario provided in the prior art.

In the prior art, when performance measurement under the network node redundancy scenario is performed, as shown in FIG. 1, three maintenance association end points (Maintenance association End Point, MEP): MEP1 105, MEP2 106, MEP3 108 are respectively configured on an optical network terminal (optical network terminal, ONT) 103, an access aggregation gateways (access aggregation gateway, AGG)1 107 and an AGG2 109, the three MEP1 105, MEP2 106 and MEP3 108 belong to the same maintenance domain (Maintenance Domain, MD) and maintenance association (Maintenance Association, MA), performance detection based on a main path is deployed, such as performance detection of the main path between the MEP1 105 and the MEP2 106; when the AGG1 107 is switched from a main node to a backup node, the AGG2 109 is upgraded from a backup node to a main node, the main path is switched to a path from the ONT 103 to the AGG2 109, and the performance detection from the MEP1 105 to the MEP3 108 needs to be reconfigured.

In the prior art, during failure detection, since a backup path is impassable, so the MEP3 108 of the backup path will be overtime, which results in a fact that the MEP3 108 will report a continuity check (Continuity Check, CC) timeout alarm, the MEP1 105 will transmit a CCM carrying a remote defect indication (Remote Defect Indication, RDI), as a result, the MEP2 106 will report a RDI alarm, and an alarm will be raised on the entire network, but this alarm is unnecessary.

SUMMARY

Embodiments of the present application provide an method and system of Ethernet performance detection, in order to solve a problem that under a network node redundancy condition, after main and backup states of a main node and a backup node are switched, an existing optical network terminal could not continue to perform Ethernet performance detection.

In the first aspect, an method of Ethernet performance detection is provided, including: receiving, by an optical network terminal ONT, a detection configuration instruction, and configuring a maintenance end point MEP according to the detection configuration instruction;

configuring, by the ONT, a performance detection path from the MEP to the VMEP according to states of the virtual maintenance end points (VMEP) configured on a main node and a backup node, wherein the VMEP includes two virtual MEPs configured on the main node and backup node, the IDs of the two virtual MEPs are identical, at the same moment, the state of one virtual MEP is main, the state of the other virtual MEP is backup, and the main node and the backup node are access aggregation devices; and transmitting, by the ONT, a message to a node corresponding to the virtual MEP with the main state.

In the first possible implementation manner of the first aspect, a virtual router redundancy protocol (VRRP) or enhanced trunk (E-Trunk) is deployed between the main node and the backup node.

In combination with the first possible implementation manner of the first aspect, in the second possible implementation manner, the media access control (MAC) address of the virtual MEP is the virtual MAC address of the VRRP or the system ID of a link aggregation control protocol (LACP).

In combination with the first possible implementation manner of the first aspect, in the third possible implementation manner, the states of the VMEP is synchronously updated with the state of the VRRP, or the states of the VMEP is synchronously updated with the state of the E-Trunk.

In the second aspect, an optical network terminal is provided, including a maintenance end point (MEP) configuration unit, a detection path configuration unit and a message transmission unit, wherein:

the MEP configuration unit is configured to receive a detection configuration instruction and configure an MEP according to the detection configuration instruction;

the detection path configuration unit is configured to configure a performance detection path from the MEP to the VMEP according to states of the virtual maintenance end points (VMEP) configured on a main node and a backup node, wherein the VMEP includes two virtual MEPs configured on the main node and backup node, the IDs of the two virtual MEPs are identical, at the same moment, the state of one virtual MEP is main, the state of the other virtual MEP is backup, and the main node and the backup node are access aggregation devices; and the message transmission unit is configured to transmit a message to a node corresponding to the virtual MEP with the main state.

In the third aspect, an Ethernet performance detection system is provided, including a main node, a backup node and an optical network terminal, the optical network terminal includes a maintenance end point (MEP) configuration unit, a detection path configuration unit and a message transmission unit, wherein:

the MEP configuration unit is configured to receive a detection configuration instruction and configure an MEP according to the detection configuration instruction;

the detection path configuration unit is configured to configure a performance detection path from the MEP to the VMEP according to states of the virtual maintenance end points (VMEP) configured on a main node and a backup node, wherein the VMEP includes two virtual MEPs configured on the main node and backup node, the IDs of the two virtual MEPs are identical, at the same moment, the state of one virtual MEP is main, the state of the other virtual MEP is backup, and the main node and the backup node are access aggregation devices; and the message transmission unit is configured to transmit a message to a node corresponding to the virtual MEP with the main state.

In the first possible implementation manner of the third aspect, a virtual router redundancy protocol (VRRP) or enhanced trunk (E-Trunk) is deployed between the main node and the backup node.

In combination with the first possible implementation manner of the third aspect, in the second possible implementation manner, the media access control (MAC) address of the virtual MEP is the virtual MAC address of the VRRP or the system ID of a link aggregation control protocol (LACP).

In combination with the first possible implementation manner of the third aspect, in the third possible implementation manner, the states of the VMEP is synchronously updated with the state of the VRRP; or the states of the VMEP is synchronously updated with the state of the E-Trunk.

In the embodiments of the present application, the two virtual MEPs with an identical ID are deployed on the main node and backup node in a communication network, since the IDs of the two virtual MEPs are identical, the virtual MEPs will trace the main and backup states of the main node and backup node, namely, when the node is a main node, the virtual MEP deployed on the node becomes effective, when the node is a backup node, the virtual MEP deployed on the node becomes ineffective, and only the virtual MEP of the main node becomes effective, in this way, there is only one MEP seen from external performance, therefore, when the node states of the main node and backup node are switched, the virtual MEP deployed on the switched main node becomes effective, the optical network terminal may automatically switch the performance detection path to the node corresponding to the virtual MEP, in order to continue to perform the network performance detection without manually modifying the configuration of the performance detection path, thus saving the operation and maintenance costs of users. Wherein, the virtual MEP is a virtual MEP, the virtual MEP deployed on the main node will trace the main state of the VRRP or the E-Trunk protocol and changes itself as the effective virtual MEP, and the MEP of the standby node will not become effective, thus there is only one actually effective MEP seen from external performance.

DESCRIPTION OF EMBODIMENTS

In order that the purposes, technical solutions and advantages of the present application are clearer, a further detailed description of the present application will be given below in combination with accompanying drawings and embodiments. It should be understood that, the specific embodiments described herein are merely used for explaining the present application, rather than limiting the present application.

In the embodiments of the present application, two virtual MEPs with an identical ID are respectively deployed on a main node and a backup node in a communication network. Since the IDs of the two virtual MEPs are identical, only the virtual MEP of the main node becomes effective. In this way, there is only one MEP seen from external performance. Therefore, when node states of the main and backup nodes are switched, the virtual MEP deployed on a node which is switched to the backup node becomes effective. An optical network terminal may automatically switch a performance detection path to a node corresponding to the virtual MEP, in order to continue to perform network performance detection.

The implementation of the present application will be described below in detail in combination with specific embodiments:

Embodiment 1

Figure 2:
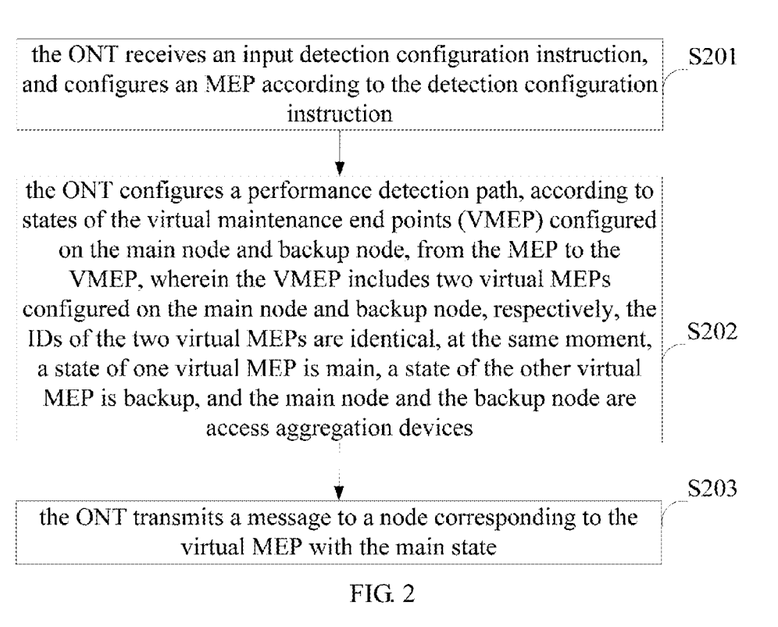
FIG. 2 is an implementation flowchart of an Ethernet performance detection method provided by embodiment 1 of the present application.
Figure 3:
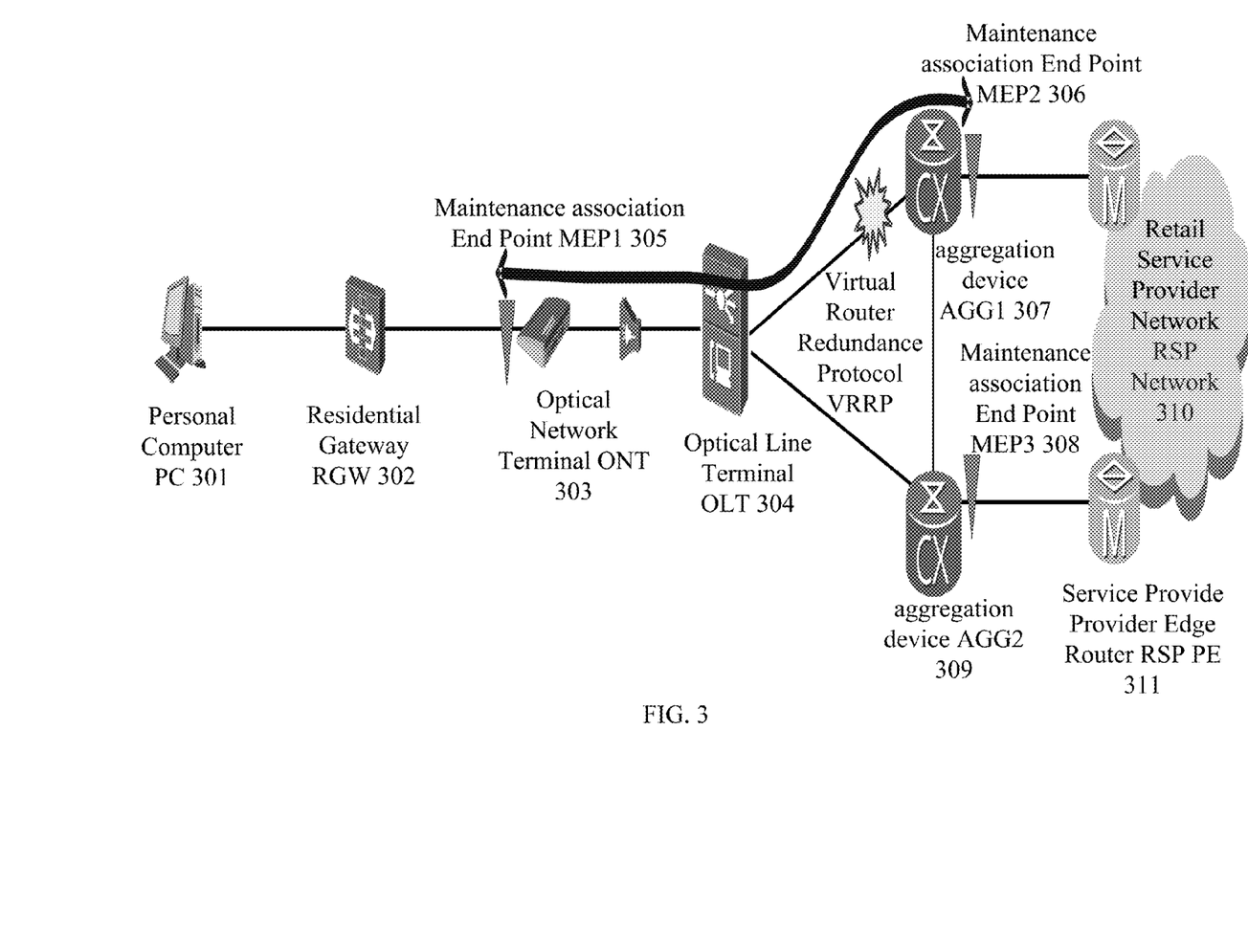
FIG. 3 is a schematic diagram of a communication system under a VRRP scenario of the Ethernet performance detection method provided by embodiment 1 of the present application.
Figure 4:
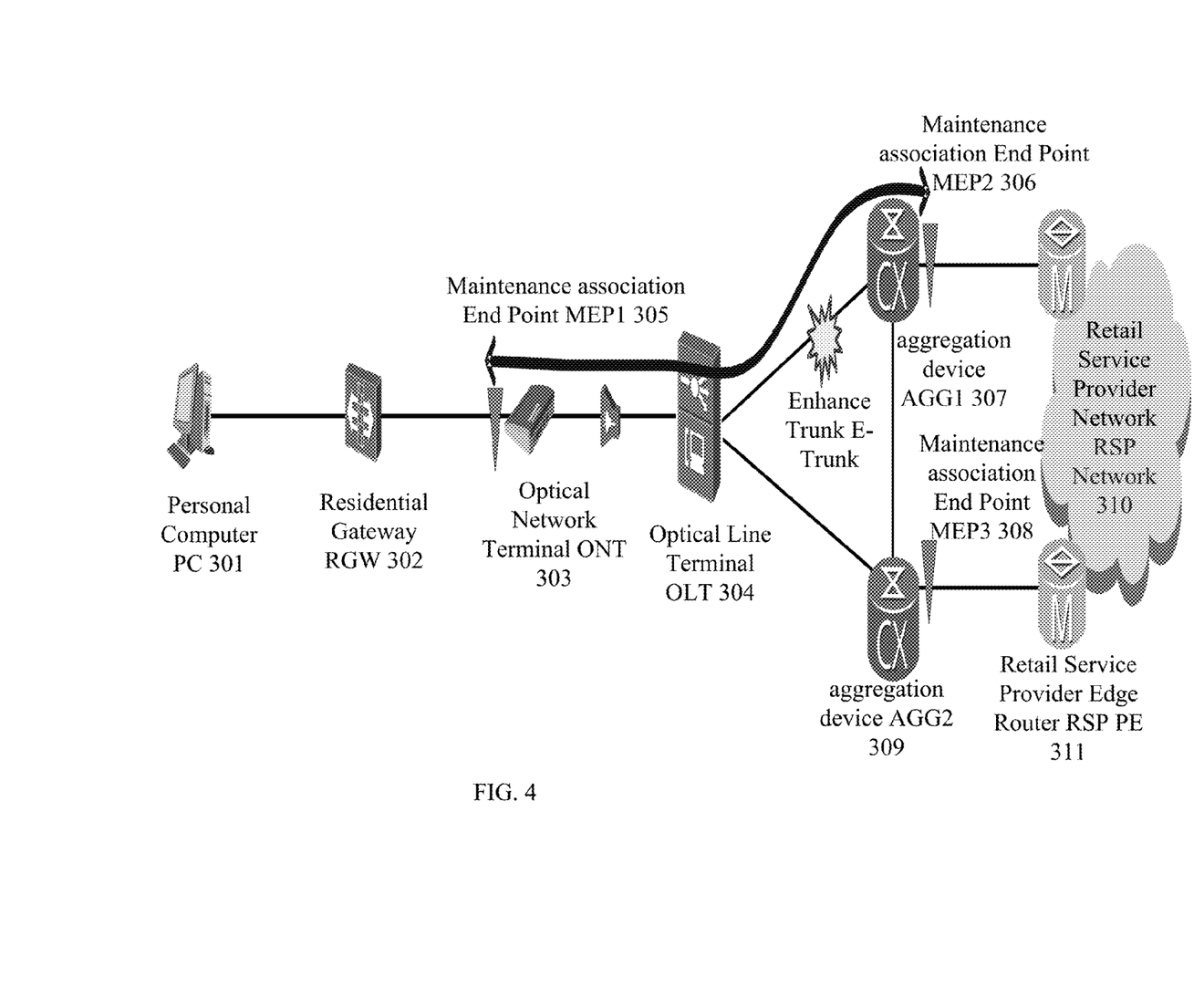
FIG. 4 is a schematic diagram of a communication system under an E-Trunk scenario of the Ethernet performance detection method provided by embodiment 1 of the present application.

FIG. 2 shows an implementation flowchart of an method of Ethernet performance detection provided by embodiment 1 of the present application. The method may be applied to a communication system as shown in FIG. 3 or FIG. 4. FIG. 3 shows a communication system under a scenario that a virtual router redundancy protocol (Virtual Router Redundancy Protocol, VRRP) is configured between the main node and the backup node. In FIG. 3, a personal computer PC 301 of an user is accessed to an optical network terminal ONT 303 through a residential gateway RGW 302, the ONT 303 is aggregated to an optical line terminal OLT 304, the OLT 304 is accessed to aggregation devices AGG1 307 and AGG2 309 in a dual-homing manner, and the AGG1 307 and the AGG2 309 negotiate main and backup roles through the VRRP protocol or enhanced trunk (Enhanced Trunk, E-Trunk). FIG. 4 shows a communication system under a scenario that enhanced trunk (Enhanced Trunk, E-Trunk) is configured between the main node and the backup node. For convenience of illustration, only parts related to the embodiments of the present application are shown in detail as follows:

in S201, the ONT 303 receives an input detection configuration instruction, and configures an MEP according to the detection configuration instruction.

In the embodiment, the ONT 303 is accessed to the aggregation device AGG1 307 and aggregation device AGG2 309 in a dual-homing manner, and the VRRP or the E-Trunk is deployed between the AGG1 307 and the AGG2 309, wherein, it is assumed that the AGG1 307 is a main router initially and the AGG2 309 is a backup router initially, and the flow of the ONT 303 will firstly pass by the AGG1 307 to arrive at a retail service provider (Retail Service Provider, RSP) network. It should be noted that, the main and backup states of the AGG1 307 and AGG2 309 depend upon the VRRP or the E-Trunk.

Before performing Ethernet performance detection, the MEP needs to be configured on the ONT 303 firstly, the identifier ID of the MEP may be set as 1, and the MEP is marked as MEP1 305.

Figure 5:
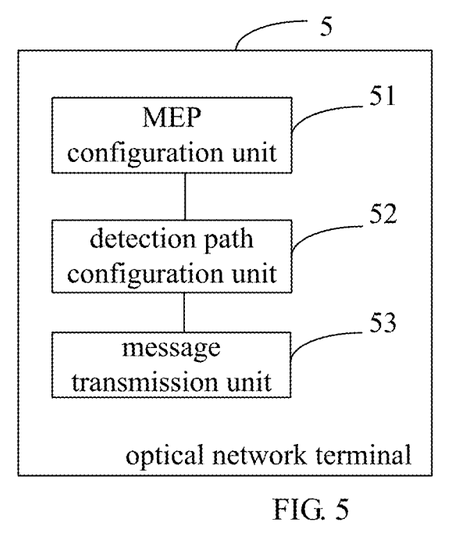
FIG. 5 is a block diagram of a structure of an optical network terminal provided by embodiment 2 of the present application.

In S202, the ONT 303 configures a performance detection path, according to states of the virtual maintenance end points (VMEP) configured on the main node and backup node, from the MEP to the VMEP, wherein the VMEP includes two virtual MEPs configured on the main node and backup node, respectively, the IDs of the two virtual MEPs are identical, at the same moment, a state of one virtual MEP is main, a state of the other virtual MEP is backup, and the main node and the backup node are access aggregation devices, for example, the AGG1 307 and AGG2 309 in FIG. 4 and FIG. 5.

In the embodiment of the present application, after the identifier ID of the MEP is configured to 1 on the ONT 303, the virtual MEPs (virtual MEP, VMEP) are respectively configured on the aggregation device AGG1 307 and aggregation device AGG2 309, IDs of the two virtual MEPs configured on the aggregation device AGG1 307 and the aggregation device AGG2 309 are identical. In the embodiment, the IDs of the two virtual MEPs are 2, thus being called VMEP2. In addition, at the same moment, a state of one virtual MEP is main, and a state of the other virtual MEP is backup.

Wherein, the main and backup states of the virtual MEP are synchronously updated with a state of the VRRP and will follow main and backup states of the VRRP, the state of the virtual MEP of the node with a main state in the VRRP is main, and the state of the virtual MEP of the node with a backup state in the VRRP is backup. The main and backup states of the virtual MEP are synchronously updated with a state of the E-Trunk and will follow main and backup states of the E-Trunk, the state of the virtual MEP of the node with a main state in the E-Trunk is main, and the state of the virtual MEP of the node with a backup state in the E-Trunk is backup.

Taking the E-Trunk as an example, two E-Trunk nodes are respectively called a local E-Trunk and an opposite E-Trunk, and variation relationship between a state of a virtual MEP deployed on the local E-Trunk and a state of a local E-Trunk is as shown in table 1:

TABLE 1

| State of the local E-Trunk | Member Eth-Trunk mode | State of the opposite Eth-Trunk | State of the local Eth-Trunk | State of local VMEP2 |
|---|---|---|---|---|
| — | Compulsory main | — | Main | Main |
| — | Compulsory backup | — | Backup | Backup |
| Main | Automatic | Backup | Main | Main |
| Backup | Automatic | Backup | Main | Main |
| Backup | Automatic | Main | Backup | Backup | wherein, in table 1, the first column is an initial state of the local E-Trunk, the second column and the third column are respectively input conditions, the fourth column and the fifth column are final states, for example, the initial state of the local E-Trunk is "backup", the current member E-Trunk is at an automatic mode, after a state of the opposite E-Trunk becomes backup, a state of the local E-Trunk becomes "main", and the virtual MEP deployed locally, namely VMEP2, also becomes "main".

At the initial state, since the state of the virtual MEP on the AGG1 307 is main, the virtual MEP on the AGG1 307 becomes effective, thus the performance detection path from the MEP1 305 to the VMEP2 is from the ONT 303 to the main node AGG1 307.

When the main and backup states of the AGG1 307 and AGG2 309 are switched, the state of the virtual MEP on the AGG2 309 is main, the virtual MEP on the AGG2 309 becomes effective, thus the performance detection path from the MEP1 305 to the VMEP2 is from the ONT 303 to the main node AGG2 309.

In addition, a media access control (Media Access Control, MAC) address of the virtual MEP may be a virtual MAC address of the VRRP, of course. The MAC address of the virtual MEP may also be a system ID of a link aggregate control protocol (Link Aggregate Control Protocol, LACP) (the system ID is an MAC address, and the system IDs of the main node and backup node are identical). In this case, MAC addresses of sources of messages transmitted by the virtual MEPs of the main node and backup node are identical.

In S203, the ONT 303 transmits a message to a node corresponding to the virtual MEP with the main state.

In the embodiment of the present application, at the initial state, the state of the virtual MEP on the AGG1 307 is main, the virtual MEP on the AGG1 307 becomes effective, thus the performance detection path from the MEP1 305 to the VMEP2 is from the ONT 303 to the AGG1 307, and the ONT 303 transmits the message to the main node AGG1 307 according to the path.

When the main and backup states of the main node and backup node are switched, the AGG2 309 becomes the main node, and the AGG1 307 becomes the backup node, thus the states of the VMEP on the AGG2 309 is correspondingly changed to be main, the states of the VMEP on the AGG1 307 is correspondingly changed to be backup, and the virtual MEP on the AGG2 309 becomes effective, thus the performance detection path from the MEP1 305 to the VMEP2 is from the ONT 303 to the main node AGG2 309.

Wherein, it should be noted that, VRRP main and backup switch may occur between the main node and the backup node, and E-Trunk main and backup switch may also occur. The VRRP and the E-Trunk are both suitable for a main and backup dual-homing scenario and are protocols used for negotiating a main and backup. Compared with the E-Trunk, the deployment of the VRRP is more flexible, a heartbeat line is unnecessary between the main node and the backup node, and the message may be transferred by a downlink ONT device.

In addition, it should be noted that, the performance detection in the embodiment is illustrated by taking packet loss and delay detection as examples, but is applicable to such failure detection as continuity check (Continuity Check, CC), loopback (LoopBack, LB), link trace (Link Trace, LT) and the like.

In the embodiment of the present application, the two virtual MEPs with an identical ID are deployed on a main node and backup node in a communication network. Since the IDs of the two virtual MEPs are identical, and the virtual MEPs will trace the main and backup states of the main node and backup node, only the virtual MEP of the main node becomes effective, in this way, there is only one MEP seen from external performance. Therefore, when the node states of the main node and backup node are switched, the virtual MEP deployed on the switched main node becomes effective, the optical network terminal may automatically switch the performance detection path to the node corresponding to the virtual MEP, the network performance detection may be perform continually, without manually modifying the configuration of the performance detection path, thus the operation and maintenance costs of users may be saved.

Embodiment 2

FIG. 5 shows a block diagram of a structure of an optical network terminal provided by embodiment 2 of the present application, the optical network terminal may form a system of Ethernet performance detection together with a main node and backup node, wherein the main node and the backup node are access aggregation devices, for convenience of illustration, only the parts related to the embodiment of the present application are shown, and the optical network terminal 5 includes an MEP configuration unit 51, a detection path configuration unit 52 and a message transmission unit 53.

Wherein the MEP configuration unit 51 is configured to receive an input detection configuration instruction and configure a maintenance end point MEP according to the detection configuration instruction;

the detection path configuration unit 52 is configured to configure a performance detection path, according to states of the virtual maintenance end points (VMEP) configured on a main node and a backup node, from the MEP to the VMEP, wherein the VMEP includes two virtual MEPs configured on the main node and backup node, the IDs of the two virtual MEPs are identical, at the same moment, a state of one virtual MEP is main, a state of the other virtual MEP is backup, and the main node and the backup node are access aggregation devices;

the message transmission unit 53 is configured to transmit a message to a node corresponding to the virtual MEP with the main state.

It should be further noted that: a virtual router redundancy protocol VRRP or E-Trunk is deployed between the main node and the backup node;

a media access control MAC of the virtual MEP is a virtual MAC of the VRRP or a system ID of a link aggregation control protocol LACP;

the states of the VMEP is synchronously updated with a state of the VRRP or a state of the E-Trunk.

The optical network terminal provided by the embodiment may be used in the foregoing corresponding optical network terminal to perform the method of Ethernet performance detection, specific reference is made to related descriptions of the embodiment corresponding to FIG. 2 of the above-mentioned optical network terminal for performing the method of Ethernet performance detection, and will not be repeated redundantly herein.

It should be noted that, in the above-mentioned embodiment of the optical network terminal, the division of the included units is only a logic function division, but is not limited to the above-mentioned division, as long as corresponding functions may be achieved; in addition, the specific titles of the functional units are merely for mutual distinguishment, rather than limiting the protection scope of the present application.

Embodiment 3

Figure 6:
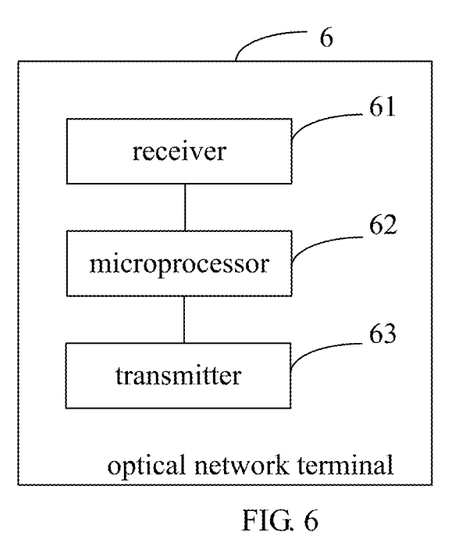
FIG. 6 is a block diagram of a structure of an optical network terminal provided by embodiment 3 of the present application.

FIG. 6 shows a block diagram of a structure of an optical network terminal provided by embodiment 3 of the present application; the optical network terminal may form an system of Ethernet performance detection together with a main node and backup node, wherein the main node and the backup node are access aggregation devices, for convenience of illustration, only the parts related to the embodiment of the present application are shown, and the optical network terminal 6 includes a receiver 61, a microprocessor 62 and a transmitter 63.

Wherein, the receiver 61 is configured to receive an input detection configuration instruction;

the microprocessor 62 is configured to configure a maintenance end point MEP according to the detection configuration instruction, configure a performance detection path, according to the states of the virtual maintenance end points (VMEP) configured on the main node and the backup node, from the MEP to the VMEP, wherein the VMEP includes two virtual MEPs configured on the main node and backup node, the IDs of the two virtual MEPs are identical, at the same moment, a state of one virtual MEP is main, a state of the other virtual MEP is backup, and the main node and the backup node are access aggregation devices;

the transmitter 63 is configured to transmit a message to a node corresponding to the virtual MEP with the main state.

It should be further noted that: a virtual router redundancy protocol VRRP or E-Trunk is deployed between the main node and the backup node;

a media access control MAC of the virtual MEP is a virtual MAC of the VRRP or a system ID of a link aggregation control protocol LACP;

the states of the VMEP is synchronously updated with a state of the VRRP or a state of the E-Trunk.

The optical network terminal provided by the embodiment may be used in the foregoing corresponding optical network terminal to perform the method of Ethernet performance detection, specific reference is made to related descriptions of the embodiment corresponding to FIG. 2 of the above-mentioned optical network terminal for performing the method of Ethernet performance detection, and will not be repeated redundantly herein.

Embodiment 4

Figure 7:
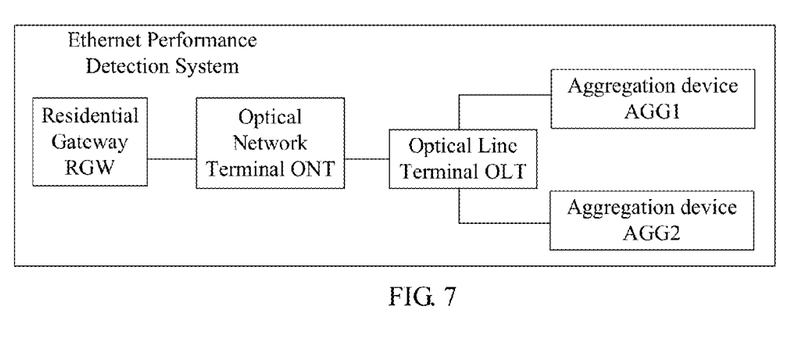
FIG. 7 is a block diagram of a structure of an Ethernet performance detection system provided by embodiment 4 of the present application.

FIG. 7 shows a block diagram of a structure of an system of Ethernet performance detection provided by embodiment 4 of the present application. The system of Ethernet performance detection includes a residential gateway RGW, an optical network terminal ONT, an optical line terminal OLT, aggregation devices AGG1 and AGG2. Wherein, a PC of an user is accessed to the optical network terminal ONT through the residential gateway RGW, the ONT is aggregated to the optical line terminal OLT, the OLT is accessed to the aggregation devices AGG1 and AGG2 in a dual-homing manner, and the AGG1 and the AGG2 negotiate main and backup roles through the VRRP protocol or E-Trunk.

Wherein, two virtual MEPs with an identical ID are deployed on the AGG1 and AGG2, since the IDs of the two virtual MEPs are identical, the virtual MEPs will trace the main and backup states of the AGG1 and AGG2, namely, when the AGG1 is a main node, the virtual MEP deployed on the AGG1 becomes effective, when the AGG1 is a backup node, the virtual MEP deployed on the AGG1 becomes ineffective, and only the virtual MEP deployed on the main node becomes effective, in this way, there is only one MEP seen from external performance. Therefore, when the node states of the AGG1 and AGG2 are switched, the virtual MEP deployed on the node which is switched to the main node becomes effective, the optical network terminal may automatically switch the performance detection path to the node corresponding to the virtual MEP, the network performance detection may be performed continually, without manually modifying the configuration of the performance detection path, thus the operation and maintenance costs of users may be saved.

The specific structure of the optical network terminal ONT is as shown in embodiment 2, and will not be repeat redundantly herein.

In addition, those of ordinary skill in the art may understand that all or a part of the steps of the methods in the above-mentioned embodiments may be implemented by a program instructing relevant hardware, the corresponding program may be stored in a computer readable storage medium, for example, the storage medium may be an ROM/RAM, a magnetic disk or optical disk, etc.

The foregoing descriptions are merely exemplary embodiments of the present application, rather than limiting the present application, and any equivalent modifications or equivalent substitutions and improvements and the like, made within the spirit and principle of the present application, are all encompassed in the protection scope of the present application.

What is claimed is:

1. A method for detecting Ethernet performance, comprising:
   receiving, by an optical network terminal (ONT), a detection configuration instruction, and configuring a maintenance end point (MEP) according to the detection configuration instruction;
   configuring, by the ONT, performance detection paths, according to a first state of a first virtual maintenance end point (VMEP) configured on a first access aggregation device and a second state of a second VMEP configured on a second access aggregation device, from the MEP to the first VMEP and second VMEP, wherein:
   a first ID of the first VMEP configured on the first access aggregation device and a second ID of the second VMEP of the second access aggregation device are identical,
      at the same moment, the first state is main and the second state is backup, and
      transmitting, by the ONT, a message to a node the first VMEP associated with the main state.

2. The method according to claim 1, wherein one of a virtual router redundancy protocol (VRRP) and an enhanced trunk (E-Trunk) is deployed between the first access aggregation device and the second access aggregation device.

3. The method according to claim 2, wherein a media access control (MAC) address of the virtual MEP is one of: a virtual MAC address of the VRRP and a system ID of a link aggregate control protocol (LACP).

4. The method according to claim 2, wherein the state of the VMEP is synchronously updated with one of a state of the VRRP and
a state of the E-Trunk.

5. A non-transitory computer-readable medium for storing instructions, the instructions comprising: one or more instructions that, when executed by one or more processors of a device, cause the one or more processors to:
   receive a detection configuration instruction and configure a maintenance end point (MEP) according to the detection configuration instruction;
   configure performance detection paths, according to a first state of a first virtual maintenance end point (VMEP) configured on a first access aggregation device and a second VMEP configured on a second access aggregation device, from the MEP to the first VMEP and the second VMEP, wherein:
      a first ID of the first VMEP is identical to a second ID of the second VMEP;
      at the same moment, the first ID is main and the second ID is backup, and
   transmit a message to the first VMEP associated with the main state.

6. An Ethernet performance detection system, comprising a first access aggregation device, a second access aggregation device, and an optical network terminal, wherein:
   the optical network terminal includes a non-transitory computer-readable medium for storing instructions, the instructions comprising: one or more instructions that, when executed by one or more processors of a device, cause the one or more processors to:
   receive a detection configuration instruction and configure a maintenance end point (MEP) according to the detection configuration instruction;
   configure performance detection paths from the MEP to the first VMEP and second VMEP according to a first state of a first virtual maintenance end point (VMEP) configured on a first access aggregation device and a second VMEP configured on a second access aggregation device, wherein:
      a first ID of the first VMEP is identical to a second ID of the second VMEP; at the same moment, the first ID is main and the second ID is backup, and
   transmit a message to the first VMEP associated with the main state.

7. The Ethernet performance detection system according to claim 6, wherein one of a virtual router redundancy protocol (VRRP) and an enhanced trunk (E-Trunk) is deployed between the main node and the backup node.

8. The Ethernet performance detection system according to claim 7, wherein a media access control (MAC) address of the virtual MEP is one of: a virtual MAC address of the VRRP and a system ID of a link aggregate control protocol (LACP).

9. The Ethernet performance detection system of claim 7, wherein the state of the VMEP is synchronously updated with one of: a state of the VRRP, and a state of the E-Trunk.

* * * * *